US012431665B2

(12) United States Patent
Carvalho et al.

(10) Patent No.: US 12,431,665 B2
(45) Date of Patent: Sep. 30, 2025

(54) VIBRATION-PROOF ELECTRICAL HIGH-CURRENT FLAT SOCKET CONTACT DEVICE

(71) Applicant: TE Connectivity Germany GmbH, Bensheim (DE)

(72) Inventors: Caio Carvalho, Bensheim (DE); Kevin Scheer, Bensheim (DE); Harald Ulrich, Bensheim (DE); Maik Schaefer, Bensheim (DE); Stefan Masak, Bensheim (DE); Holger Stange, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 385 days.

(21) Appl. No.: 17/741,935

(22) Filed: May 11, 2022

(65) Prior Publication Data

US 2022/0368071 A1 Nov. 17, 2022

(30) Foreign Application Priority Data

May 12, 2021 (DE) ..................... 10 2021 112 425.5

(51) Int. Cl.

*H01R 13/627* (2006.01)
*H01R 13/11* (2006.01)
*H01R 13/502* (2006.01)

(52) U.S. Cl.

CPC ....... *H01R 13/6275* (2013.01); *H01R 13/113* (2013.01); *H01R 13/502* (2013.01)

(58) Field of Classification Search

CPC ...... H01R 13/11; H01R 13/15; H01R 13/193; H01R 13/639; H01R 13/629; H01R 13/187; H01R 13/6275

See application file for complete search history.

(56) References Cited

U.S. PATENT DOCUMENTS 5,588,884 A * 12/1996 Rudoy .................. H01R 31/02 439/787
6,685,506 B1 2/2004 Nakamura et al.
6,773,314 B2 8/2004 Mills et al.
6,793,542 B1 9/2004 White (Continued)

FOREIGN PATENT DOCUMENTS

CN 101340023 A 1/2009
CN 107017524 A 8/2017

(Continued)

OTHER PUBLICATIONS

German Office Action, Application No. 102021112425.5, Dated: Feb. 7, 2022, 10 pages.

(Continued)

*Primary Examiner* — Tulsidas C Patel
*Assistant Examiner* — Carlos E Lopez-Pagan
(74) *Attorney, Agent, or Firm* — Barley Snyder

(57) ABSTRACT

An electrical flat socket contact device includes a contact chamber, a plurality of electrical contact springs arranged in the contact chamber, and a mechanical retaining spring arranged in the contact chamber separately from the electrical contact springs. A tab contact is insertable into the contact chamber. The electrical contact springs electrically contact the tab contact and the mechanical retaining spring mechanically retains the tab contact.

19 Claims, 4 Drawing Sheets

(56) References Cited

U.S. PATENT DOCUMENTS

| | | | | |
|---|---|---|---|---|
| 7,399,188 | B1 * | 7/2008 | Shen | H01R 13/40 439/78 |
| 7,425,157 | B1 * | 9/2008 | Hung | H01R 31/06 439/945 |
| 7,588,454 | B2 | 9/2009 | Nakata et al. | |
| 9,716,332 | B1 | 7/2017 | Wimmer et al. | |
| 9,793,620 | B2 | 10/2017 | Marsh et al. | |
| 10,109,966 | B2 * | 10/2018 | Tsai | H01R 13/502 |
| 10,224,658 | B2 | 3/2019 | Marsh et al. | |
| 2010/0203776 | A1 | 8/2010 | Zhao | |
| 2011/0250795 | A1 * | 10/2011 | Su | H01R 4/26 439/660 |
| 2012/0015529 | A1 | 1/2012 | Schoenfeld et al. | |
| 2013/0130556 | A1 * | 5/2013 | Blakborn | H01R 13/187 439/626 |
| 2014/0308857 | A1 | 10/2014 | Goesmann et al. | |
| 2017/0062966 | A1 * | 3/2017 | Stange | H01R 13/6275 |
| 2017/0324184 | A1 | 11/2017 | Lehner et al. | |
| 2019/0148872 | A1 | 5/2019 | Lin et al. | |
| 2020/0067223 | A1 * | 2/2020 | Schaefer | H01R 13/187 |
| 2023/0352891 | A1 | 11/2023 | Tsai | |

FOREIGN PATENT DOCUMENTS

| | | | | |
|---|---|---|---|---|
| CN | 107210542 | A | 9/2017 | |
| DE | 4138071 | C1 | 5/1993 | |
| DE | 102015216632 | A1 | 2/2017 | |
| EP | 2599165 | A1 * | 6/2013 | H01R 13/187 |
| EP | 3145035 | A1 * | 3/2017 | H01R 13/113 |
| JP | 2004139826 | A | 5/2004 | |
| JP | 2017050281 | A | 3/2017 | |
| KR | 1020170033319 | A | 3/2017 | |

OTHER PUBLICATIONS

Japanese Office Action dated Jun. 13, 2023, with English translation thereof, corresponding to Application No. 2022-076898, 18 pages.

Extended European Search Report dated Sep. 22, 2022 corresponding to Application No. 22166023.6-1201, 12 pages.

Korean Office Action dated Oct. 2, 2024 with English translation, corresponding to Application No. 10-2022-0057804, 17 pages.

Chinese Office Action dated May 19, 2025 with English translation, corresponding to Application No. 202210499018.5, 18 pages.

European Patent Office Communication dated Dec. 12, 2024, corresponding to Application No. 22 166 023.6-1201, 8 pages.

* cited by examiner

VIBRATION-PROOF ELECTRICAL HIGH-CURRENT FLAT SOCKET CONTACT DEVICE

CROSS-REFERENCE TO RELATED APPLICATIONS

This application claims the benefit of the filing date under 35 U.S.C. § 119(a)-(d) of German Patent Application No. 102021112425.5, filed on May 12, 2021.

FIELD OF THE INVENTION

The invention relates to a contact device and, more particularly, to a vibration-proof electrical high-current flat socket contact device.

BACKGROUND

In the electrical sector (electronics, electrical engineering, electrics, electrical energy technology etc.), a large number of electrical connectors or connector devices, socket connectors, pin connectors and/or hybrid connectors etc.—referred to below as (electrical) connectors (also: mating connectors)—are known which serve to transmit electrical currents, voltages, signals and/or data with a wide range of currents, voltages, frequencies and/or data rates. In low-, medium- and high-voltage and/or low-, medium- and high-current contexts, and in particular in the automotive sector, such connectors have to ensure transmission of electrical power, signals and/or data permanently, repeatedly and/or after a comparatively long period of inactivity for a short time in mechanically stressed, warm, possibly hot, contaminated, damp and/or chemically aggressive environments. Due to a wide range of applications, a large number of specially designed connectors are known.

Such a connector and, if applicable, its associated housing (for example in the case of a connector or a connector device) or higher-level housing (for example in the case of a connector device) can be attached to an electrical wire, a cable, a cable harness, etc.—referred to below as a pre-assembled (electrical) cable (also: electrical entity)—or at/in an electrical device, such as for example at/in a housing, at/on a leadframe, at/on a circuit board etc., of a (power-) electrical, electrooptical or electronic component or a corresponding aggregation etc. (electrical entity).

If a connector (with/without a housing) is situated on a cable, a wire or a cable harness, this is also called a flying (plug-in) connector or a plug, a socket or a coupling; if it is situated at/in an electrical, electrooptical or electronic component, aggregation etc., this is also called a connector device, such as for example a (built-in/mounted) connector, a (built-in/mounted) plug or a (built-in/mounted) socket. Furthermore, a connector at such a device is often referred to as a (plug) receptacle, pin header, pin strip or header.—In the context of electrical power engineering (generating, converting, storing and transporting high-voltage electrical current within electricity grids, preferably with three-phase high-voltage transmission), one speaks here of cable fittings because of their comparatively complex structure.

Such a connector must ensure proper transmission of electricity, wherein mutually corresponding and partially complementary connectors (connector and mating connector) usually have locking devices and/or fastening devices for permanent but usually releasable locking and/or fastening of the connector at/in the mating connector or vice versa. Furthermore, an electrical connecting device for a connector, for example comprising or at least having: an actual contact device (terminal; usually formed materially in one piece or integrally, for example a (crimp) contact element etc.) or contact device (terminal; usually formed in one piece and from several or two parts, or materially in one piece, for example a (crimp) contact device), must be held securely therein.

Efforts are continually being made to improve electrical connectors and their terminals, in particular to design them more effectively and to design and/or to produce them at lower cost. Compliance with vibration requirements (LV 214: class or degree of severity: 2, 3 and/or 4) for electrical high-current connections often fails, on account of the comparatively heavy terminals for high-current connections, due to an increased relative movement between the terminals (here: a tab contact and a flat socket contact device) caused as a result.

SUMMARY

An electrical flat socket contact device includes a contact chamber, a plurality of electrical contact springs arranged in the contact chamber, and a mechanical retaining spring arranged in the contact chamber separately from the electrical contact springs. A tab contact is insertable into the contact chamber. The electrical contact springs electrically contact the tab contact and the mechanical retaining spring mechanically retains the tab contact.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
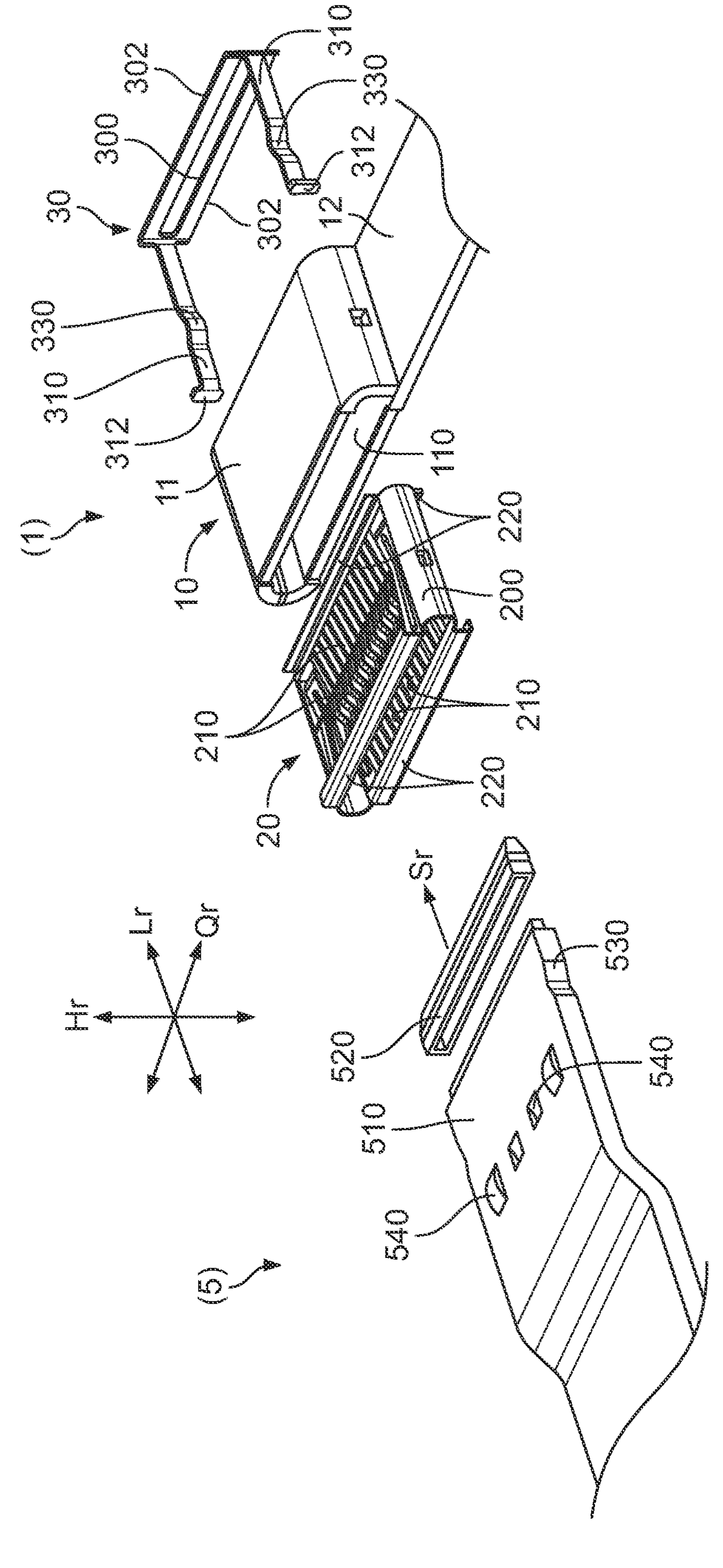
FIG. 1 is an exploded perspective view of a vibration-proof electrical high-current connection according to an embodiment.

The invention is explained in greater detail below on the basis of exemplary embodiments with reference to the appended drawings, which are diagrammatic and not to scale. Portions, elements, component parts, units, components and/or patterns which have an identical, unique or analogous configuration and/or function are identified by the same reference signs. A possible alternative which is not shown in the drawing and/or is not definitive, a static and/or kinematic reversal, a combination etc. with respect to the exemplary embodiments of the invention or a component, a pattern, a unit, a component part, an element or a portion thereof, can further be gathered from the list of reference signs and/or the description of the figures.

In the case of the invention, a feature (portion, element, component part, unit, component, function, variable etc.) can be of positive configuration, that is to say present, or of negative configuration, that is to say absent. In this specification, a negative feature is not explained explicitly as a feature if value is not placed on it being absent according to the invention. That is to say, the invention which is actually created, and not one constructed by the prior art, consists in omitting the said feature.

A feature of this specification can be utilized not only in a specified manner and/or way, but rather also in another manner and/or way (isolation, combination, replacement, addition, on its own, omission, etc.). It is possible, in particular, in the description, the list of reference signs, the patent claims and/or the drawings, to replace, add or omit a feature in the patent claims and/or the description on the basis of a reference sign and a feature which is assigned to it, or vice versa.

The features of the description can also be interpreted as optional features; that is to say, each feature can be considered to be an optional feature, that is to say a feature which is not mandatory. Therefore, a separation of a feature, possibly including its periphery, from an exemplary embodiment is possible, it then being possible for the feature to be transferred to a generalized inventive concept. The absence of a feature (negative feature) in an exemplary embodiment shows that the feature is optional in relation to the invention. Furthermore, in the case of a type term for a feature, a generic term for the feature can also be implicitly understood (possibly further hierarchical breakdown into subgenus, etc.), as a result of which a generalization of the feature is possible, for example with consideration of equivalent effect and/or equivalence.

The invention is explained in more detail below on the basis of exemplary embodiments (FIGS. 1-4 and FIG. 5) of a variant of a vibration-proof electrical high-current connection 0 (referred to below as connection 0) comprising a vibration-proof high-current flat socket contact device 1 (referred to below as flat socket contact device 1) and a vibration-proof high-current tab contact device 5 (referred to below merely as tab contact device 5). The connection 0 may be for a vehicle, such as a vehicle having an electric traction motor. Two embodiments of the flat socket contact device 1 and of the tab contact device 5 are illustrated here.

Although the invention is described and illustrated further in greater detail by way of exemplary embodiments, the invention is not restricted by way of the disclosed exemplary embodiments, but rather is of more fundamental nature. Other variations can be derived therefrom without departing from the scope of protection of the invention. The invention can be used in general in the electrical sector in the case of an electrical entity. The entity according to the invention comprises an electrical device and a flat socket contact device 1, a connector and/or a connection, wherein the flat socket contact device 1, the connector and/or the connection are/is designed according to the invention. Such an entity can be configured, for example, as an electrical device, an assembled electrical cable, an electrical assembly, an electrical printed circuit board, an electrical component, an electrical module, an electrical appliance, an electrical instrument, an electrical unit, an electrical installation, an electrical system etc. One exception is formed here by terrestrial electrical power engineering.

A vehicle—in particular a motor vehicle (road vehicle), but also: rail vehicle, watercraft and/or aircraft—having an electric traction motor is understood to mean a motorized vehicle which, in addition to an electric traction motor, can have a further non-electric drive, such as an internal combustion engine for example. That is to say, a vehicle having an electric traction motor can be understood to mean, for example, a hybrid electric vehicle, an electric vehicle (solely electromotive drive), a fuel cell vehicle etc.

The drawings show only those spatial portions of the subject matter of the invention which are necessary for understanding of the invention. Designations such as connector and mating connector, terminal and mating terminal etc. are to be interpreted synonymously; they may be mutually interchangeable.

The explanation of the invention on the basis of the drawings relates below to a longitudinal direction Lr (a selection thereof is the plug-in direction Sr), a transverse direction Qr and a vertical direction Hr of the connection 0 according to the invention.

FIGS. 1 to 5 each show the tab contact device 5 and the flat socket contact device 1. A free longitudinal end portion of the tab contact device 5 can be inserted or is inserted (connection 0) into a contact chamber 110 of the flat socket contact device 1. The contact chamber 110 is mainly or substantially cuboidal. In the contact chamber 110, firstly a plurality of electrical contact springs 210 contacts the tab contact device 5 and, separately therefrom, secondly at least one mechanical retaining spring 30 retains the tab contact device 5 in the contact chamber 110. The plurality of electrical contact springs 210 are used to transmit high electrical currents at high electrical voltages and the at least one mechanical retaining spring 30 retains the tab contact device 5 securely in the contact chamber 110, even when vibrations are applied.

The tab contact device 5 comprises a mainly or substantially cuboidal tab contact 510 and an electrically insulating touch protection device 520 at a front free end. A connection portion (transition portion, electrical further contacting etc.) is situated at an opposite end of the tab contact 510 of the tab contact device 5. The tab contact device 5 can of course also have a different design to the designs shown. The tab contact device 5 can be arranged in a housing of a plug-in tab contact connector (in a flying, built-in, mounted etc. manner).

In order to be mechanically retained in the contact chamber 110, the tab contact 510 has at least one clamping device, in particular two clamping devices, 530 which can interact with a clamping device 330, in particular two clamping devices 330, of the flat socket contact device 1 in the contact chamber 110 in such a way that the tab contact 510 can be retained in the contact chamber 110 even under vibration loading. In an embodiment, the respective clamping device 530 are designed as clamping recesses 530 arranged in the narrow longitudinal sides of the tab contact 510. In another embodiment, the at least one clamping device, in particular the two clamping device, 530 may be arranged at/in the large-surface-area sides of the tab contact 510. Sides of the mechanical retaining spring 30 and of the tab contact 510 which relate to one another can be of complementary design at least in portions for this purpose.

Figure 4:
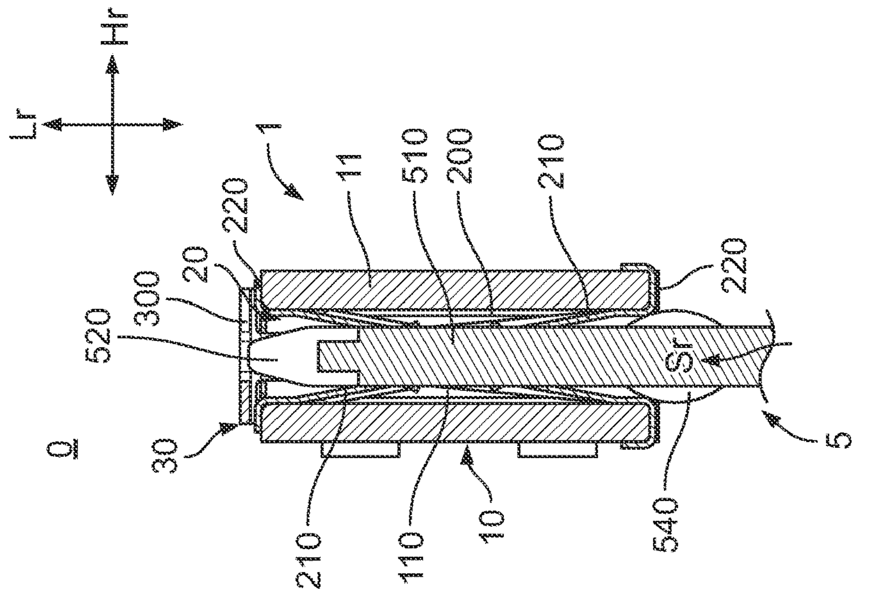
FIG. 4 is a sectional side view of the vibration-proof electrical high-current connection.
Figure 5:
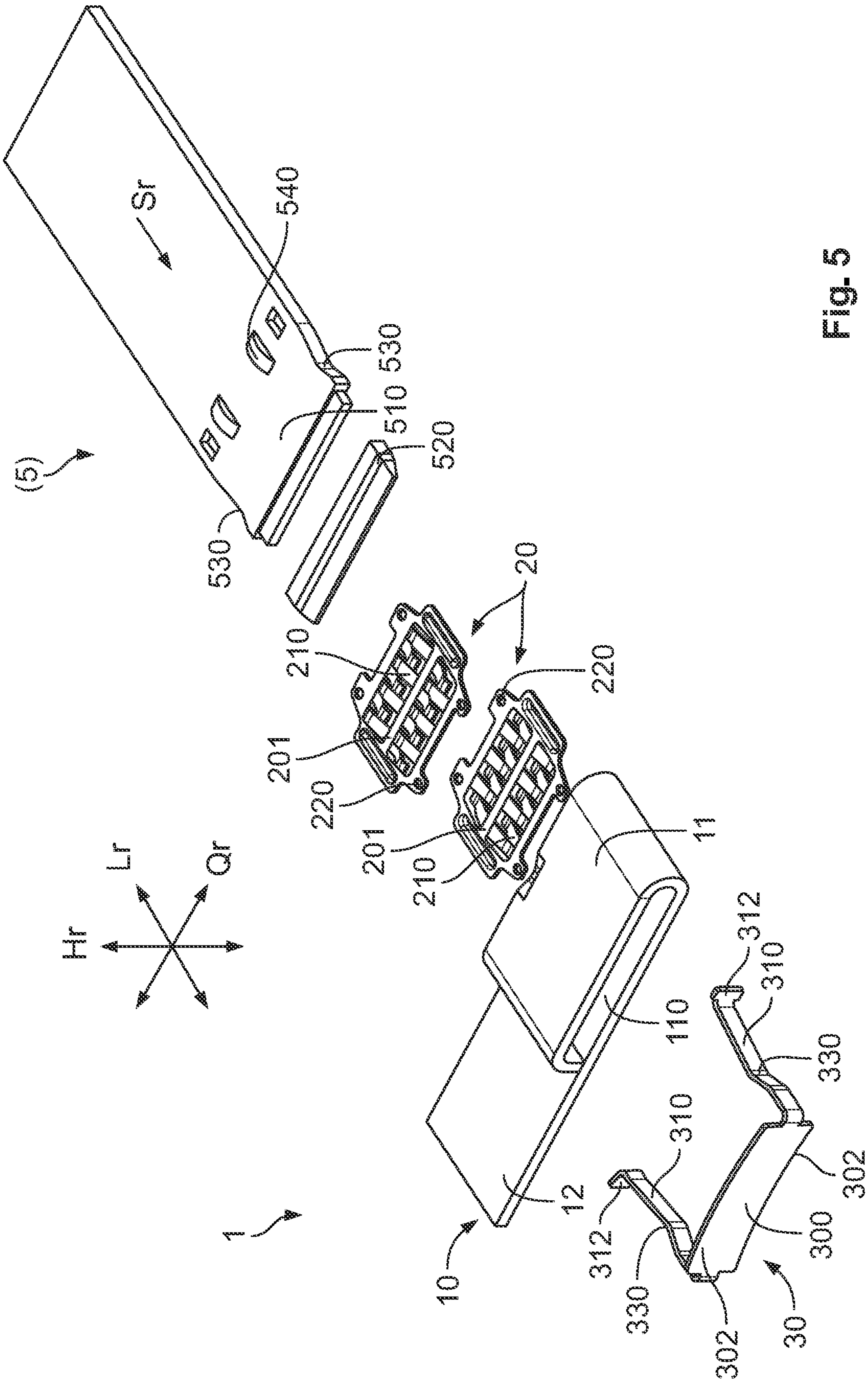
FIG. 5 is a vibration-proof electrical high-current connection according to another embodiment.

The tab contact 510 can, on at least one side, in particular a large-surface-area side, have at least one locking projection 540 which can be seated on/at an outer edge of an opening of the contact chamber 110 on the outside of the flat socket body 10 or on the outside of a retaining device 220 of a tab contact receptacle 20 in the connection 0 and in this way stabilize the tab contact 510 on the flat socket body 10 (see FIG. 4). The tab contact 510 has, on the respective side, two such locking projections 540 which are situated next to one another in the transverse direction Qr. Furthermore, the tab contact 510 has, in particular on each of two mutually opposite sides, in particular large-surface-area sides thereof, at least one, in particular two, such locking projections 540. The respective locking projections 540 can be designed as a corrugation 540, as shown in FIGS. 1 and 5.

In an embodiment, the flat socket contact device 1 comprises a flat socket body 10, an inner tab contact receptacle 20 and a mechanical or mechanical-electrical retaining spring 30. A connection portion (transition portion, electrical further contacting etc.) situated further on the other side of a socket region of the flat socket contact device 1, in the present case of the flat socket body 10, is no longer shown. The flat socket contact device 1 can be arranged in a housing of a (plug-in) socket connector (in a flying, installed, mounted etc. manner). The flat socket contact device 1 can of course also have a different design to the designs shown.

The flat socket body 10 has a socket portion 11 with the mainly or substantially cuboidal contact chamber 110 and has a connection portion 12, in an embodiment integrally adjoining the socket portion 11 in the transverse direction Qr, for further power-electrical contacting of the flat socket contact device 1. The socket portion 11 has two openings which are situated at a distance from one another in the longitudinal direction Lr of the flat socket contact device 1 and in a respective plane, the planes extending in the vertical direction Hr and in the transverse direction Qr of the flat socket contact device 1. The connection portion 12 is designed for example as a transition portion or a further-contacting portion. The socket portion 11 and/or the transition portion may be formed from a solid rectangular material layer.

The socket portion 11 and/or the connection portion 12 can be designed substantially as a solid material layer-portion without a substantial passage recess. The socket portion 11 and/or the connection portion 12 may have/has substantially or mainly the same thickness over approximately: 80%, 85%, 90%, 92.5%, 95%, 97.5%, 98%, 98.5% or 99% of their/its surface area.

Figure 3:
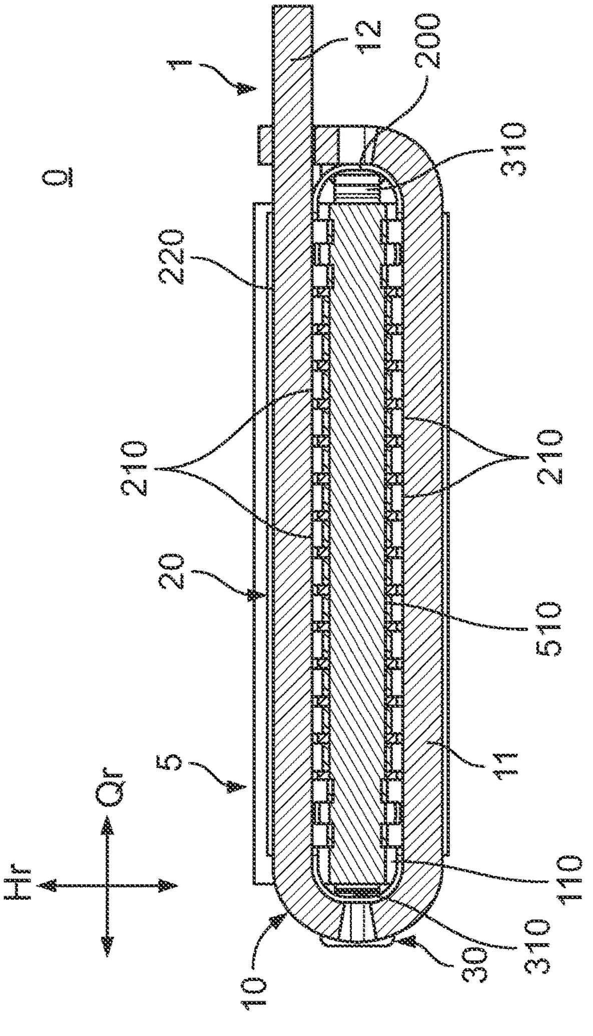
FIG. 3 is a sectional front view of the vibration-proof electrical high-current connection.

The flat socket body 10 has, in a front side view thereof as shown in FIG. 3, a substantially P-shaped cross section, that is to say the flat socket body 10 is designed as an angled flat socket body 10 (plug-in direction and direction of further contacting do not lie in a line). The flat socket body 10 can of course also have a different design to the designs shown; for example, the flat socket body 10 can be designed as a 0° flat socket body, a crimpable flat socket body 10 etc.

The flat socket body 10 can be bent into shape from a planar, solid, in particular rectangular, material layer. The material layer (longitudinal extent in the transverse direction for the 90° flat socket body 10) can be bent back over itself, for example to form the flat socket body 10 on a longitudinal end portion, in order to form the socket portion 11, wherein the socket portion 11 is provided with an outer shape which corresponds (in a substantially cuboidal manner) to the inner contact chamber 110 formed as a result. Here, the longitudinal end of this longitudinal end portion is bent over onto a central portion of the material layer and fastened to/on it, it being possible for this to be performed for example by partial penetration of the longitudinal end and the central portion. Here, the longitudinal end can additionally be caulked, riveted, welded, soldered and/or adhesively bonded to the central portion. It is of course possible to merely utilize welding, soldering or adhesive bonding of the longitudinal end to the central portion. The material layer can be designed for example as a comparatively thick metal sheet (high current).

The tab contact receptacle 20 is arranged on the inside of the contact chamber 110 of the flat socket body 10 and has, for electrically contacting the tab contact 510, a large number of electrical or electromechanical contact springs 210 which are designed, for example, as contact projections 210, contact spring arms 210 or contact lamellae 210. The contact springs 210 may extend in the longitudinal direction Lr. The contact springs 210 can of course also have a different design to the designs shown; for example, the contact springs 210 can for example not run exclusively in the longitudinal direction Lr, not all be of substantially identical design, be designed in accordance with the local current-carrying capacity thereof etc.

The tab contact receptacle 20 of FIGS. 1 to 4 is designed as a substantially flat contact spring cage 20 which is open at the front and at the rear and comprises the electrical contact springs 210. The contact spring cage 20 comprises a receiving body 200 with an elongated (flat design of the contact spring cage 20) o-shaped cross section into the interior of which the tab contact 510 can be inserted. In particular, the electrical contact springs 210 are provided, designed or arranged at/in the large-surface-area sides of the contact spring cage 20 and project or extend inward into the contact spring cage 20 or the contact chamber 110. The tab contact receptacle 20 or the contact spring cage 20 can of course also have a different design to the designs shown.

The electrical contact springs 210 can be designed as inner boundaries of the contact chamber 110 of the/a flat socket body 10 of the flat socket contact device 1. In an embodiment, the electrical contact springs 210 can be cut out of an inner wall of the flat socket body 10. As an alternative, the electrical contact springs 210 can be arranged on an inner wall of the flat socket body 10 in the contact chamber 110. The electrical contact springs 210 can further be arranged at/in a tab contact receptacle 20 which is arranged as a separate part of the flat socket contact device 1 in the contact chamber 110.

The contact spring cage 20 is mounted within the contact chamber 110 of the flat socket body 10, for which reason the contact spring cage 20 has at least one retaining device 220 which is designed as a bent-over retaining lug 220. The contact spring cage 20, in an embodiment, has at least one such retaining device 220 at each of its two ends in the longitudinal direction Lr. A retaining device 220 can be provided at a narrow and/or a long (FIGS. 1 and 4) longitudinal end of the retaining device 220. In the state in which the contact spring cage 20 is mounted in the contact chamber 110, the retaining device 220 is seated on/at the outside of an opening of the contact chamber 110 and in this way retains the contact spring cage 20 in the contact chamber 110 in a longitudinal direction Lr.

The tab contact receptacle 20 of FIG. 5 comprises two contact plates 20 or contact frames 20, wherein a single contact plate or a single contact frame has a receiving body 201 of substantially plate-like or frame-like design. The respective contact plate 20 or the respective contact frame 20 is provided on a large-surface-area inner wall of the flat socket body 10 within the contact chamber 110. The electrical contact springs 210 are provided, designed or arranged at/in the respective contact plate 20 or the respective contact frame 20 and project or extend inward into the contact chamber 110. The tab contact receptacle 20 or the contact plates 20 or the contact frames 20 can of course also have a different design to the designs shown.

Before the flat socket body 10 is bent into shape, the possibly respective contact plate 20 or the possibly respective contact frame 20 can be mounted, for example mechanically fastened, welded, soldered and/or adhesively bonded, on the later large-surface-area inner walls of the flat socket body 10. Depending on its design, the contact spring cage 20 can be provided before (retaining device(s)) or after the flat socket body 10 is bent into shape.

The contact plate 20, the contact frame 20 or the contact spring cage 20 can have at least one fastening device by which it can be secured to/in the contact chamber 110 of the flat socket body 10 in at least one longitudinal direction Lr of the flat socket contact device 1. Here, the fastening device can be designed as a latching lug, a (spring) clamp, a latching hook or a clip with which the contact plate 20, the contact frame 20 or the contact spring cage 20 can be fastened to/in the contact chamber 110. In an embodiment, the at least one tab contact receptacle 20 is fastened to/in the flat socket body 10 and in the contact chamber 110 with six degrees of rotational freedom and with at least five, and in an embodiment six, degrees of linear freedom.

The mechanical or mechanical-electrical retaining spring 30 is designed as a u-shaped clamping spring 30 which can be inserted into the contact chamber 110 (FIGS. 1 to 5) and possibly additionally also into the tab contact receptacle 20 (FIGS. 1 to 4) in the longitudinal direction Lr. The mechanical retaining spring 30 can of course also have a different design to the designs shown; for example, the mechanical retaining spring 30 can be in the form of a claw, in the form of a clasp or in the form of a cage; can be designed with just one single mechanical clamping spring arm or more than two mechanical clamping spring arms 310, a different locking device than a mechanical clamping spring arm 310, a different retaining device 312 etc.

The mechanical clamping spring 30, shown in FIGS. 1 and 5, has a lug-like base 300 (crosspiece of the U-shape of the retaining spring 30) extending in the transverse direction Qr, a mechanical or mechanical-electrical clamping spring arm 310 extending away from each of the longitudinal ends of said base (limbs of the U-shape of the retaining spring 30). The base 300 further extends, together with at least one, in particular two, retaining devices 302, in the vertical direction Hr. Here, a retaining device 302 can be designed as a flat extension of the base 300, which flat extension is seated at the rear on an edge of the opening of the contact chamber 110 on the flat socket body 10 or on the retaining devices 220 of the tab contact receptacle 20 in the flat socket contact device 1, as shown in FIGS. 3 and 4.

In the state in which the mechanical clamping spring 30 is inserted into the contact chamber 110, the mechanical clamping spring arms 310 of said clamping spring extend on the inside of the contact chamber 110 laterally along the narrow side walls thereof. Here, a respective mechanical clamping spring arm 310 is arranged either directly adjacent to an inner wall of the contact spring cage 20, in the embodiment of FIGS. 1 to 4, or directly adjacent to a narrow inner wall of the flat socket body 10, in the embodiment of FIG. 5, in the contact chamber 110.

The mechanical clamping spring arms 310 extend through the contact chamber 110 and secure the mechanical clamping spring 30, on the other side of its base 300, in the contact chamber 110 in a longitudinal direction Lr by retaining devices 312. The retaining devices 302 of the base 300 and the retaining devices 312 of the mechanical clamping spring arms 310 secure the mechanical clamping spring 30 in the contact chamber 110 in both longitudinal directions Lr. In particular, the mechanical retaining spring 30 is fastened to/in the flat socket body 10 and in the contact chamber 110 with six degrees of rotational freedom and with at least five, and in an embodiment six, degrees of linear freedom.

A respective mechanical clamping spring arm 310 has, analogously to the respective clamping device 530, in particular to the respective clamping recess 530, of the tab contact 510, a clamping device 330, in particular an inwardly directed clamping projection 330. Here, the narrow, lug-like mechanical clamping spring arm 310 is correspondingly bent, that is to say the clamping projection 330 is bent into the mechanical clamping spring arm 310.

Figure 2:
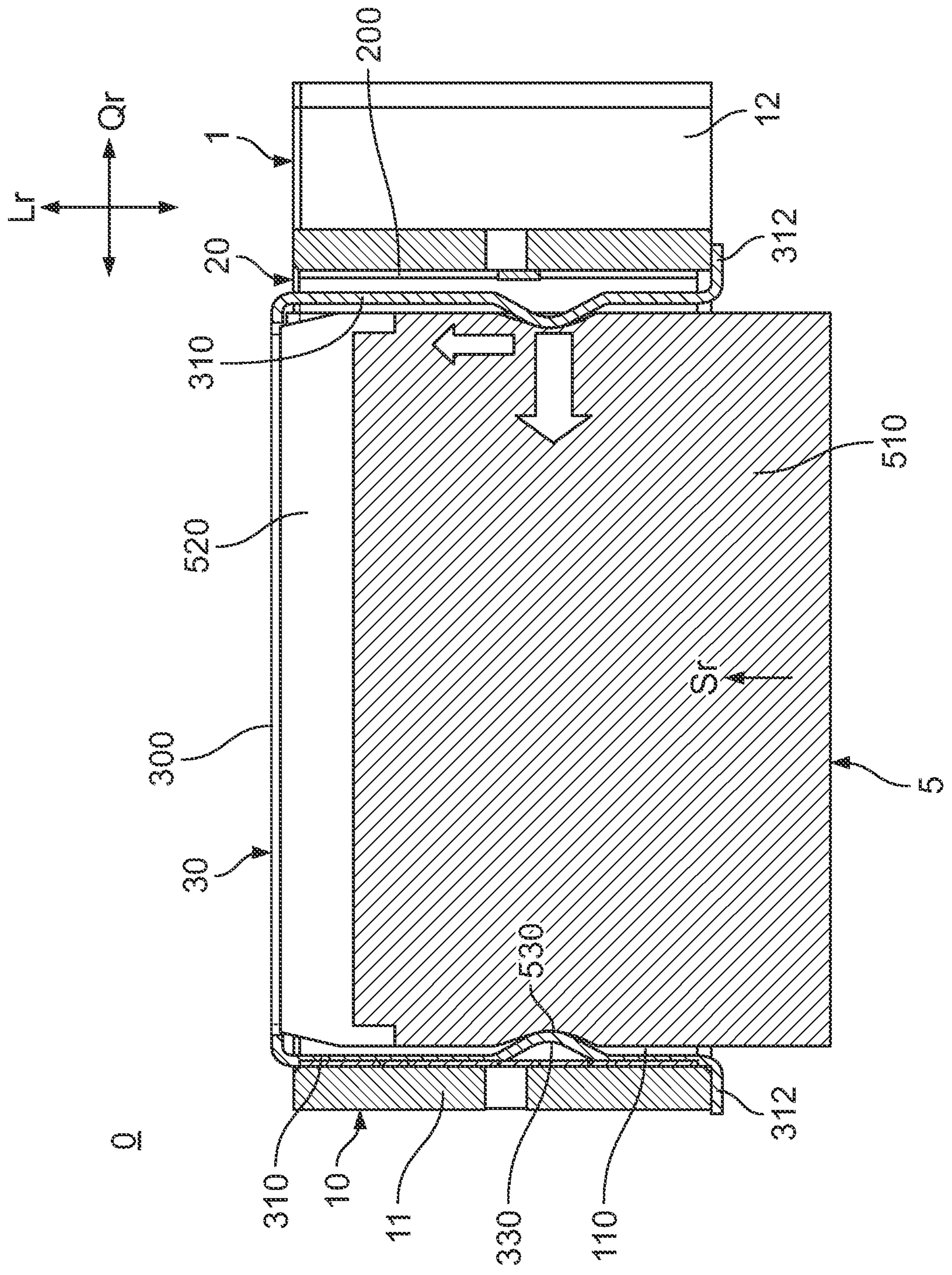
FIG. 2 is a sectional plan view of the vibration-proof electrical high-current connection.

With the connection 0 established, as shown in FIG. 2, the clamping projections 330 of the mechanical clamping spring arms 310 engage into the respective clamping recesses 530 of the tab contact 510 and securely retain these in the contact chamber 110 even when vibrations are applied since the mechanical clamping spring 30 is fastened in the contact chamber 110 in all translational and rotational directions. The tab contact 510 can be mechanically retained in the contact chamber 110 by the mechanical retaining spring 30 in at least one longitudinal direction Lr or both longitudinal directions Lr. The tab contact 510 can further be mechanically retained in the contact chamber 110 by the mechanical retaining spring 30 in at least one transverse direction Qr or both transverse directions. Furthermore, the tab contact 510 can be electrically contacted (primary function) and can be mechanically retained (secondary function) in the contact chamber 110 by the electrical contact springs 210 in at least one vertical direction Hr or both vertical directions Hr. This can of course be arranged statically or kinematically in reverse. The mechanical clamping spring 30 and/or the mechanical clamping spring arm or arms 310 can of course also have a different design to the designs shown.

The base 300 can be designed as a resilient base which has the tendency to pull the mechanical clamping spring arms 310 out of the contact chamber. Furthermore, the mechanical retaining spring 310, with its clamping spring arms at the front, can be inserted into the contact chamber 110, wherein the clamping spring arms extend along the narrow inner sides of the contact chamber 110 or of the contact spring cage 20.

In an embodiment, the at least one retaining device 220 of the tab contact receptacle 20 is provided in a manner rotated through approximately 90° with respect to the at least one retaining device 312 of the mechanical retaining spring 30.

The mechanical retaining spring 30 is further designed, for example, as a vibration resistance spring, that is to say can be referred to as such. A single mechanical retaining spring 30 may be arranged at/in the flat socket contact device 1. Furthermore, the flat socket body 10, the tab contact receptacle 20 and/or the mechanical retaining spring 30 can be formed in one piece, materially in one piece or in particular integrally.

A one-piece design is understood to mean a design of the flat socket body 10, the tab contact receptacle 20 or the retaining spring 30 in which the individual parts thereof are secured to one another in a non-positively and/or positively locking manner and can be separated into the individual parts thereof again without damage. In the case of a multipartite design, a non-positively and/or positively locking connection (necessarily) is missing or a bond is established by a third part.

A materially (adhesively) one-piece design is understood to mean a design of the flat socket body 10, the tab contact receptacle 20 or the retaining spring 30 in which the individual parts thereof are secured to one another substance-to-substance (welded, soldered, adhesively bonded, laminated etc.) and cannot be separated into the individual parts thereof without damage. In this case, the bond can further be produced by a non-positively and/or positively locking connection (not in the case of an integral design).

An integral design is understood to mean a design of the flat socket body 10, the tab contact receptacle 20 or the retaining spring 30 in which there is only one single component part, which can be separated only by being destroyed. The component part is manufactured from a single original piece (metal sheet, blank etc.) and/or from a single original mass (molten metal), which for its part is necessarily an integral part. An inner bond is made by adhesion and/or cohesion. In all the embodiments, it is additionally possible to provide coating, deposition, galvanization etc.

The following statements can be applied to all embodiments of the invention. According to the invention, the flat socket contact device 1 and the tab contact device 5 or the mechanical clamping spring 30 and the tab contact 510 can be mutually designed in such a way that, when the tab contact device 5 is plugged into the flat socket contact device 1, these two contact parts 30, 510 automatically move toward one another or pull together owing to the mechanical retaining spring 30 or clamping spring 30 (clamping device 530 snaps/slides into the clamping device 330 or vice versa) and therefore are partly independent of the flat socket body 10.

The mechanical retaining spring 30 or clamping spring 30 not only mechanically holds the flat socket contact device 1 and the tab contact device 5 together but rather pulls the tab contact 510 into the contact chamber 110 in a specific region in the process. The mechanical retaining spring 30 or clamping spring 30 can pull the tab contact 510 into the contact chamber 110 depending on the design, wherein there is a fixed contact point on the tab contact 510. Accordingly, the flat socket contact device 1 and the tab contact device 5 are seated fixedly against one another at least at this point. The mechanical retaining spring 30 generates a clamping force perpendicular to the plug-in direction Sr of the tab contact 510 (arrow pointing to the left in FIG. 2) which further stabilizes or centers the tab contact 510 in the flat socket contact device 1.

In an embodiment, a free end of the tab contact device 5, that is to say for example the tab contact 510 or the contact protection device 520, is seated on/at the base 300 in a or exactly one region at/in the contact chamber 110. Here, the base 300 as a resilient base 300 is designed in a bent manner (see FIG. 5, vertical direction Hr as bending axis) in such a way that a central region of the base 300 can be supported on an edge of an opening of the contact chamber 110 in such a way that as a result the at least one mechanical clamping spring arm 310 with its retaining device 312 is pulled against the edge of its opening of the contact chamber 110. As a result, the mechanical retaining spring 30 or clamping spring 30 can be accommodated in the contact chamber 110 with mechanical pretension in the longitudinal direction Lr.

Owing to this resilient base 300, the tab contact 510 can further likewise be accommodated in the contact chamber 110 with mechanical pretension in the longitudinal direction Lr. For this purpose, a first distance between the free longitudinal end of the tab contact device 5 (tab contact 510, touch protection device 520) and the at least one clamping device 530 of the tab contact 510 on the one hand and a second distance between the central region of the base 300 and the at least one clamping device 330 of the mechanical retaining spring 30 or clamping spring 30 on the other hand have to be correspondingly matched to one another. If these two distances are, for example, approximately the same or the first distance is for example somewhat greater than the second distance, the tab contact 510 can be automatically retained or clamped in the mechanical retaining spring 30 or clamping spring 30 by the mechanical retaining spring 30 or clamping spring 30.

In such a case, the mechanical retaining spring 30 or clamping spring 30 exerts a mechanical (compressive) pretension onto the tab contact device 5 between the free end thereof and the at least one clamping device 530 thereof by the bent and resilient base 300 and the at least one clamping device 330 thereof. At the same time, the mechanical retaining spring 30 or clamping spring 30, by the bent and resilient base 300 thereof and a retaining device 312 of the at least one clamping spring arm 310 thereof, can exert a (compressive) pretension onto the edges of the two openings of the contact chamber 110.

The recesses 530 and a spring geometry of the mechanical retaining spring 30 are designed in such a way that sufficient axial and clamping forces are generated in order to retain the tab contact 510 in a substantially or mainly stable position and therefore to considerably reduce relative movements between the tab contact 510 and the flat socket contact device 1 and possibly entirely or at least temporally entirely prevent said relative movements.

A clamping device 330 of a mechanical clamping spring arm 310 and a respective clamping device 530 of the tab contact 510 can be mutually designed in such a way that, when vibrations are applied to the electrical connection, the tab contact 510 has the tendency to move further into the contact chamber 110. This can be implemented for example as follows. In the case of an inwardly directed clamping projection of the mechanical clamping spring arm 310 which is arranged in the tab contact 510 with mirror-image symmetry with respect to a transverse direction Qr of the tab contact 510; a front edge of a clamping recess 530 of the tab contact 510 can be configured to be steeper in the tab contact 510 than a rear edge of the clamping recess 530 in the tab contact 510, as shown in FIG. 5.

Since an additional or separate retaining spring 30 is implemented in addition to the contact springs 210, the retaining spring 30 can be designed especially for retaining purposes and the electrical contact springs 210 can be designed especially for electrically contacting the tab contact 510. There is no need to take into consideration a design of the retaining spring 30 for electrically contacting and/or the electrical contact springs 210 for retaining the tab contact 510.

Electrically contacting (a plurality of electrical or electromechanical contact springs 210) and mechanically retaining (at least one mechanical or mechanical-electrical retaining spring 30) the tab contact 510 in the flat socket contact device 1 are implemented separately from one another in the flat socket contact device 1. On account of similar partial solutions (electrical contact and mechanical contact) for both objects (electrical contacting and mechanical retaining), there is of course overlapping between the partial solutions in the case of the overall solution according to the invention.

As used herein, electrical or electromechanical is intended to mean that the plurality of (electrical) contact springs 210 in a tab contact 510 inserted into the flat socket contact device 1 primarily has an electrical functionality and only secondarily a mechanical functionality. Analogously, mechanical or mechanical-electrical is intended to mean that the at least one (mechanical) retaining spring 30 in the tab contact 510 inserted into the flat socket contact device 1 primarily has a mechanical functionality and only secondarily an electrical functionality or no electrical functionality. For example, the retaining spring 30 can be produced from an electrically conductive, poorly conductive or non-conductive material, without reducing an intended electrical suitability of an electrical connection comprising the flat socket contact device 1 and the tab contact 510 or reducing it in such a way that it no longer exists.

The flat socket contact device 1 can, in accordance with LV 214, a German connector test, meet the vibration requirements of class or in accordance with degree of severity: 2, 3 and/or 4. In particular, the vibration requirement of class or in accordance with degree of severity 3 is met by the flat socket contact device 1. Furthermore, it may be possible for the flat socket contact device 1, in accordance with LV 214, to not meet the vibration requirements of class or in accordance with degree of severity: 4 and/or higher. Furthermore, the flat socket contact device 1 can be designed for electrical voltages of at least approximately: 200 V, 300 V, 400 V, 500 V, 600 V, 750 V, 1 kV, 1.25 kV or 1.5 kV, and/or for electrical currents of at least approximately: 200 A, 300 A, 400 A, 500 A, 600 A, 800 A, 1 kA or 1.25 kA. It is of course possible to design the flat socket contact device 1 for voltages of below 200 V and/or currents of below 200 A.

The flat socket contact device 1 may be designed for a use temperature of approximately −40° C. to approximately: 120° C., 140° C., 150° C., 160° C., 170° C., 180° C., 190° C. or 200° C. The flat socket contact device 1 is further designed for copper cable cross sections of at least approximately: 16 mm2, 25 mm2, 35 mm2, 50 mm2, 70 mm2, 95 mm2, 120 mm2, 150 mm2 and 185 mm2 or more; aluminum cables may have to be converted. These statements of course also apply to a mating terminal of the flat socket contact device 1, that is to say the tab contact device 5 with the tab contact 510.

The connector according to the invention has a connector substrate and the flat socket contact device 1 provided thereon/therein. Such a connector substrate can be designed for example as a (connector) housing, a retainer, a carrier, a circuit board etc.

What is claimed is:

1. An electrical flat socket contact device, comprising:
- a contact chamber into which a tab contact is insertable;
- a plurality of electrical contact springs arranged in the contact chamber and electrically contacting the tab contact, the electrical contact springs are arranged at a tab contact receptacle separate from the contact chamber; and
- a mechanical retaining spring arranged in the contact chamber separately from the electrical contact springs, the mechanical retaining spring mechanically retaining the tab contact, the mechanical retaining spring has a base having a retaining device seated on an edge of the contact chamber.

2. The electrical flat socket contact device of claim 1, wherein the electrical flat socket contact device, in accordance with test LV 214, meets a plurality of vibration requirements of class or in accordance with degree of severity 2, 3, and/or 4.

3. The electrical flat socket contact device of claim 1, wherein the electrical flat socket contact device is designed for electrical voltages of at least approximately 200V and/or is designed for electrical currents or at least approximately 200A.

4. The electrical flat socket contact device of claim 1, wherein a flat socket body defines the contact chamber, a front side of the flat socket body has a substantially P-shaped cross section and is bent from a planar material layer.

5. The electrical flat socket contact device of claim 4, wherein the flat socket body has a socket portion and a connection portion, at least one of the socket portion and the connection portion is substantially a solid material layer without a passage recess.

6. The electrical flat socket contact device of claim 1, wherein the electrical contact springs form inner boundaries of the contact chamber.

7. The electrical flat socket contact device of claim 6, wherein the tab contact receptacle is a contact plate, a contact frame, or a contact spring cage that is open at a front in a plug-in direction.

8. The electrical flat socket contact device of claim 1, wherein the mechanical retaining spring has a mechanical clamping spring arm arranged in the contact chamber and holding the tab contact, the mechanical clamping spring arm engages a side of the tab contact to retain the tab contact in the contact chamber.

9. The electrical flat socket contact device of claim 8, wherein the mechanical clamping spring arm has an inwardly directed clamping projection.

10. The electrical flat socket contact device of claim 8, wherein the mechanical clamping spring arm and a tab contact receptacle having the electrical contact springs form an insertion space for the tab contact.

11. The electrical flat socket contact device of claim 10, wherein the mechanical clamping spring arm is arranged in the tab contact receptacle.

12. The electrical flat socket contact device of claim 1, wherein the mechanical retaining spring is substantially u-shaped and has a pair of mechanical clamping spring arms projecting from the base, the tab contact is clamped between the mechanical clamping spring arms.

13. The electrical flat socket contact device of claim 12, wherein the base is resilient and is biased to pull the mechanical clamping spring arms out of the contact chamber.

14. The electrical flat socket contact device of claim 12, wherein the mechanical clamping spring arms extend along inner sides of the contact chamber or along inner sides of a contact spring cage in the contact chamber having the electrical contact springs.

15. The electrical flat socket contact device of claim 12, wherein the mechanical retaining spring is secured in the contact chamber in and opposite to a longitudinal direction.

16. A connector, comprising:
- a flat socket contact device, the flat socket contact device including:
- a contact chamber into which a tab contact is insertable;
- a plurality of electrical contact springs arranged in the contact chamber and electrically contacting the tab contact, the electrical contact springs are arranged at a tab contact receptacle separate from the contact chamber; and
- a mechanical retaining spring arranged in the contact chamber separately from the electrical contact springs, the mechanical retaining spring mechanically retaining the tab contact, the mechanical retaining spring has a base having a retaining device seated on an edge of the contact chamber.

17. The connector of claim 16, wherein a front side of the flat socket body has a substantially P-shaped cross section and is bent from a planar material layer.

18. An electrical connection, comprising:
- an electrical tab contact device having a tab contact; and
- a flat socket contact device including a contact chamber into which the tab contact is inserted, a plurality of electrical contact springs arranged in the contact chamber and electrically contacting the tab contact, and a mechanical retaining spring arranged in the contact chamber separately from the electrical contact springs, the mechanical retaining spring corresponding to the tab contact and mechanically retaining the tab contact, a clamping device of a mechanical clamping spring arm of the mechanical retaining spring corresponds to a clamping recess of the tab contact, the clamping recess of the tab contact has a front edge and a rear edge, the front edge is steeper than the rear edge such that the tab contact is biased to move further into the contact chamber.

19. The electrical connection of claim 18, wherein the tab contact has a locking projection seated at an outer edge of an opening of the contact chamber, the locking projection is a corrugation in the tab contact.

* * * * *